Figure 4:
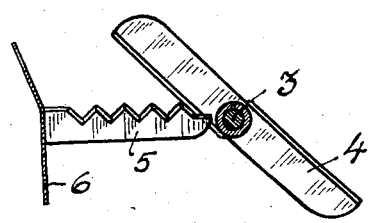

Dec. 2, 1958　　　A. B. GRÖNBERG　　　2,862,536
STRAW CUTTER FOR COMBINES
Filed Aug. 9, 1954　　　　　　　　　8 Sheets-Sheet 1
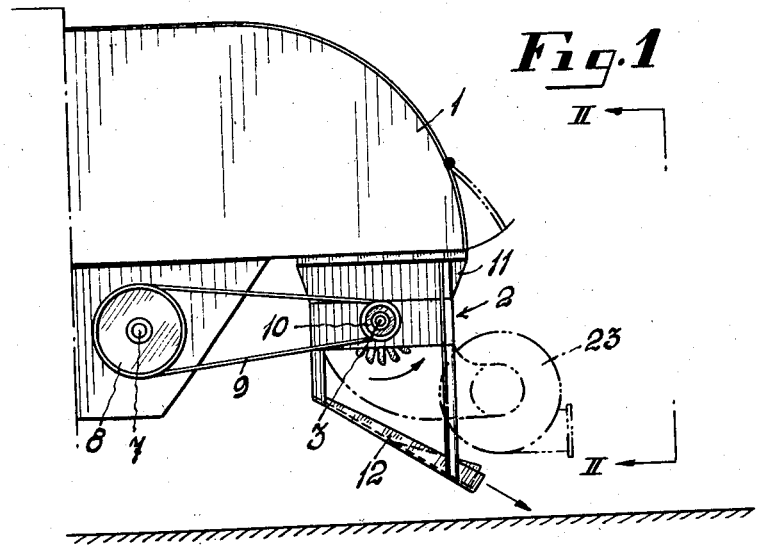
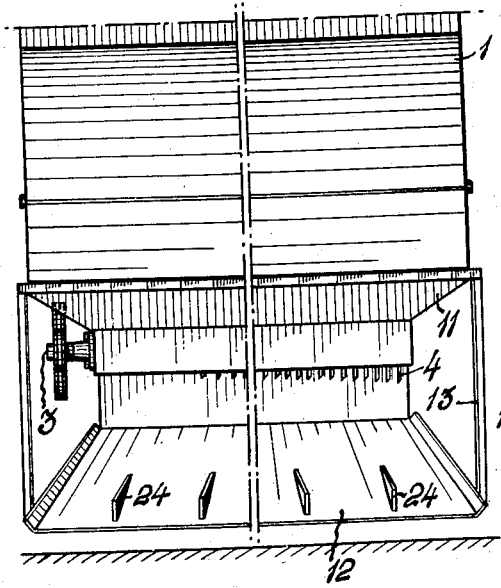
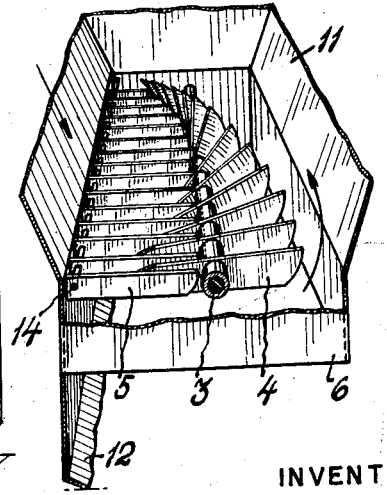
INVENTOR
ANTON B. GRONBERG
By Cushman, Darby &
Cushman
ATTORNEYS INVENTOR
ANTON B. GRONBERG
By Cushman, Darby
+ Cushman
ATTORNEYS

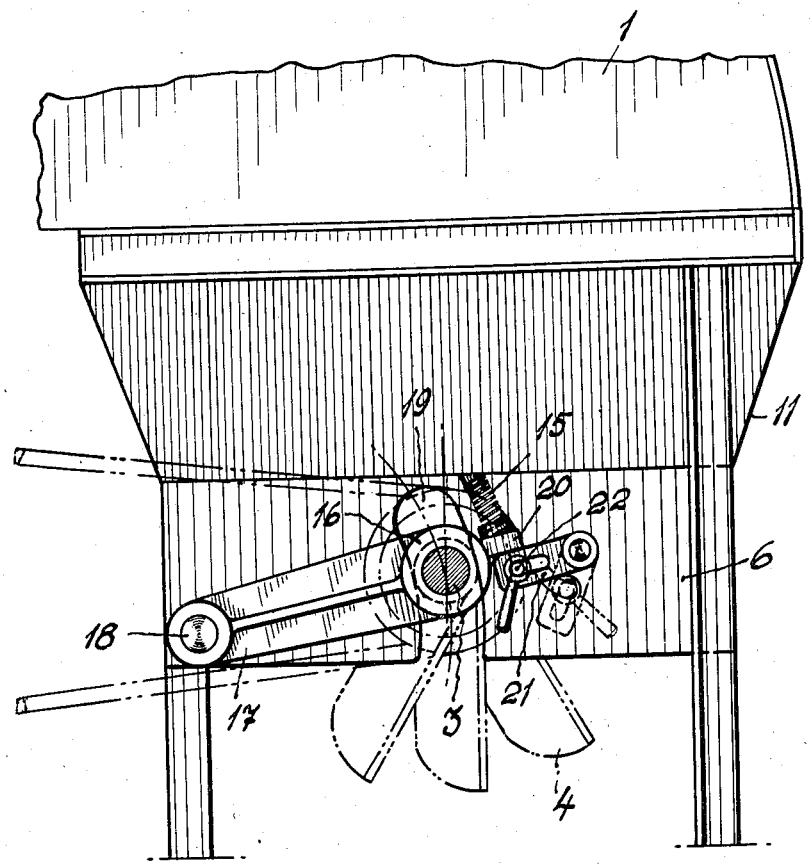

Dec. 2, 1958     A. B. GRÖNBERG     2,862,536
STRAW CUTTER FOR COMBINES
Filed Aug. 9, 1954     8 Sheets-Sheet 4
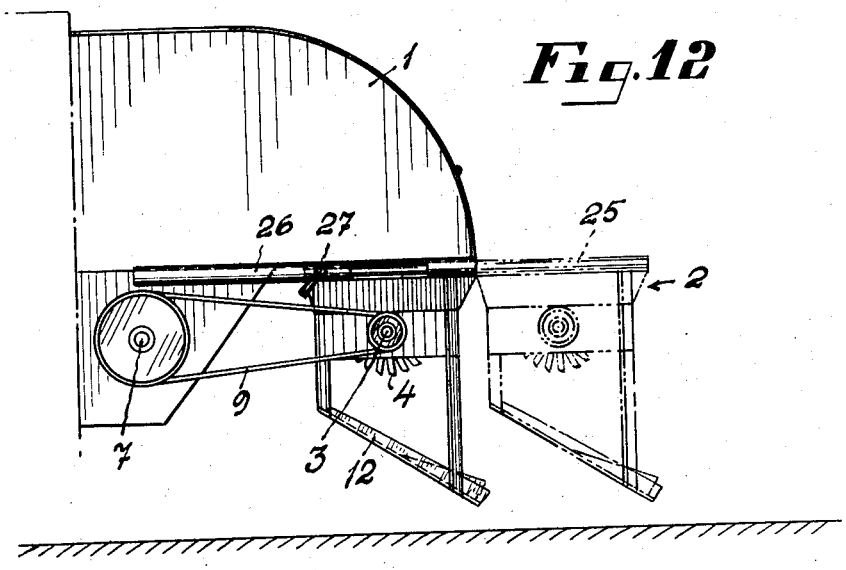
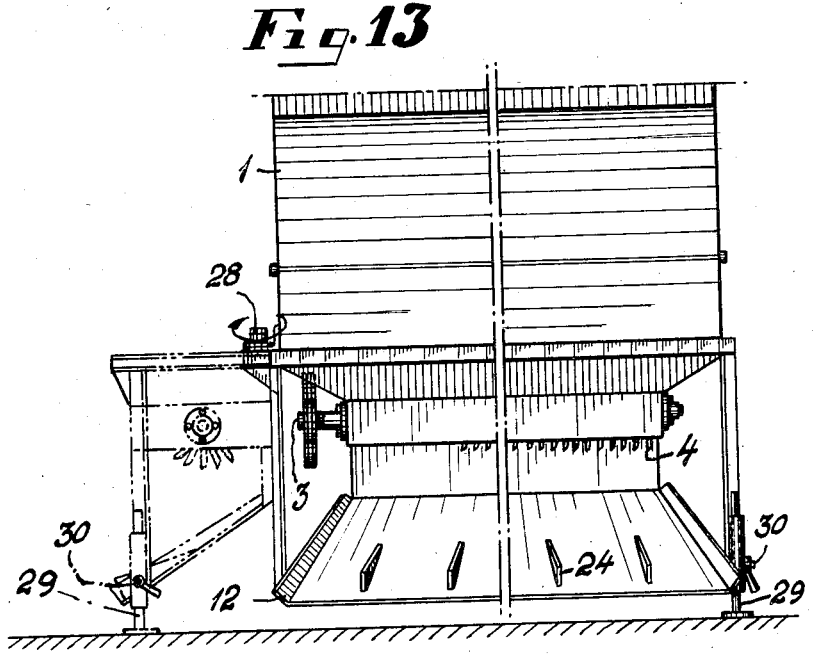
INVENTOR
ANTON B. GRONBERG
ATTORNEYS

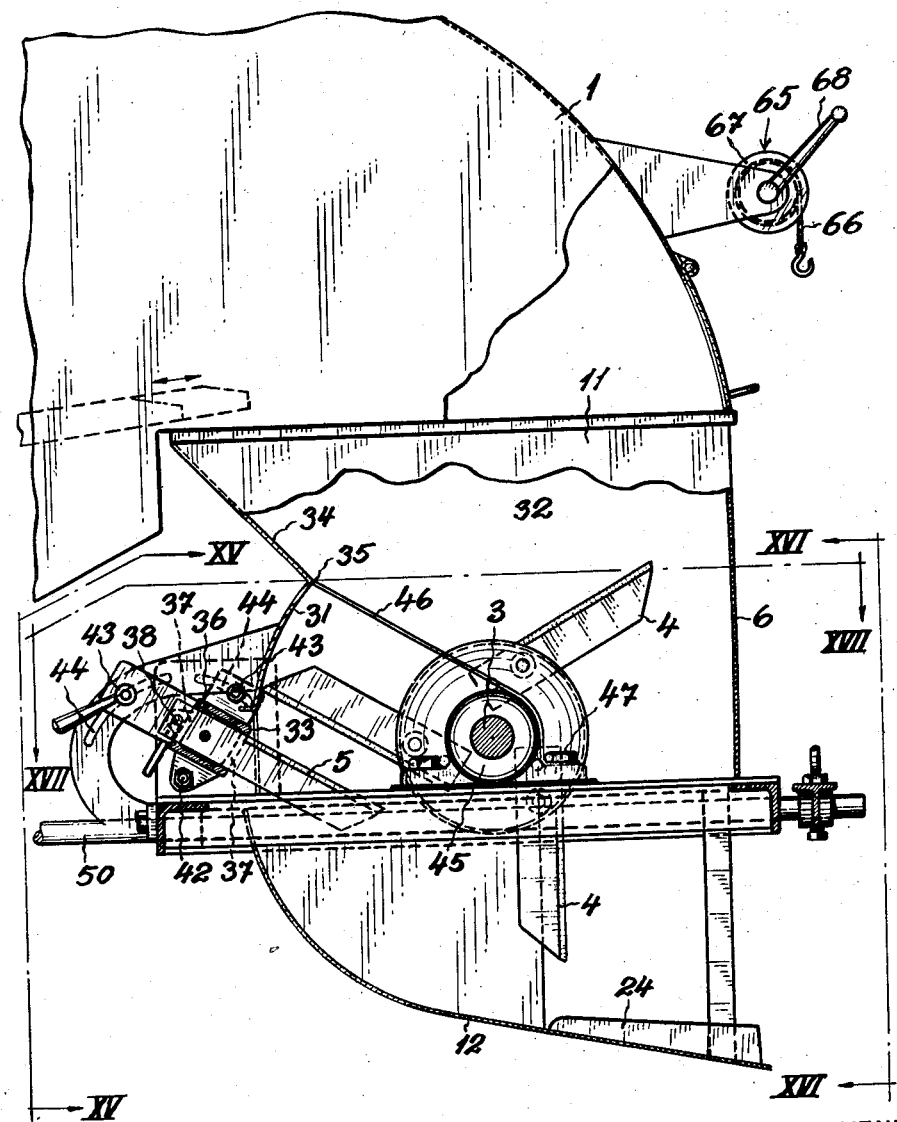

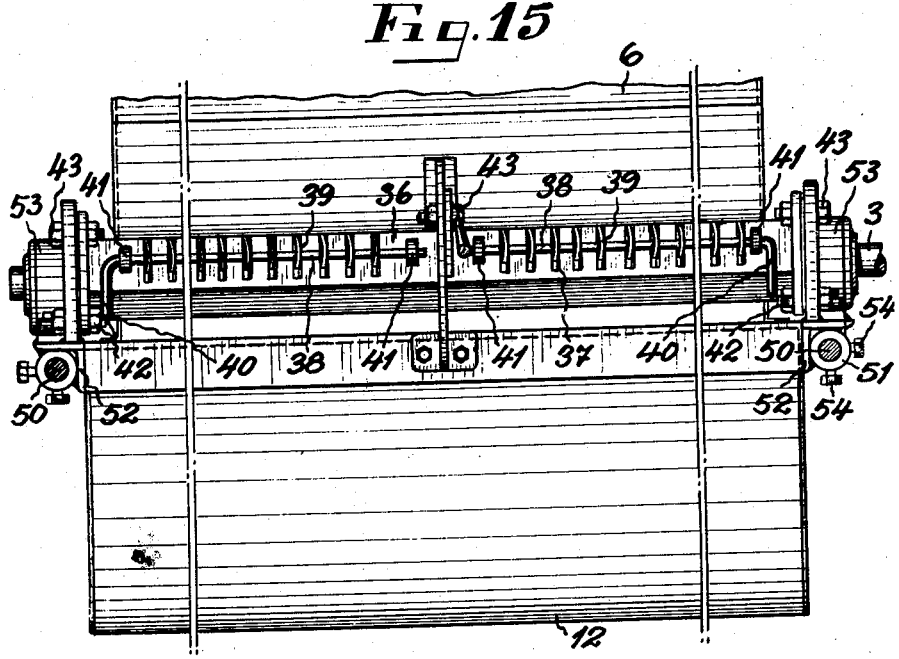
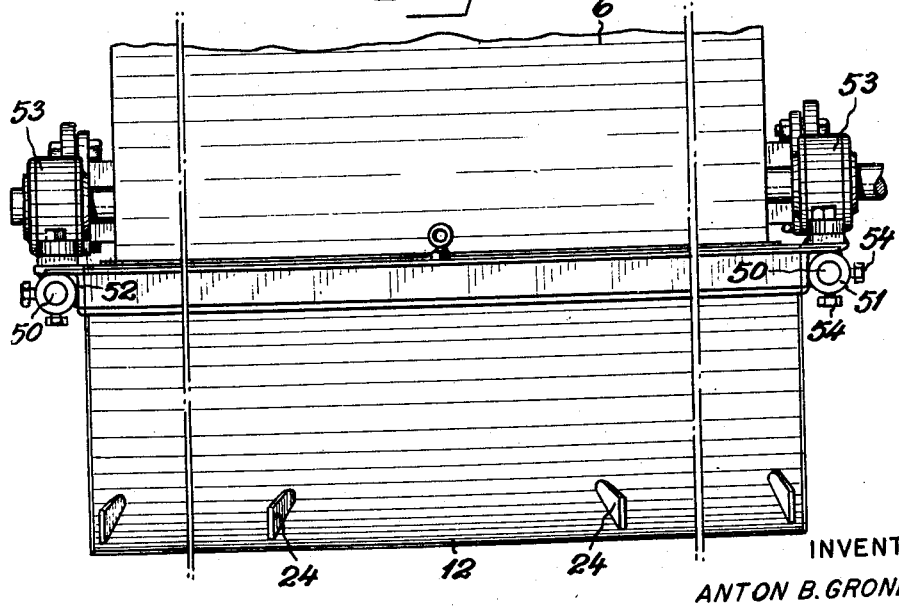

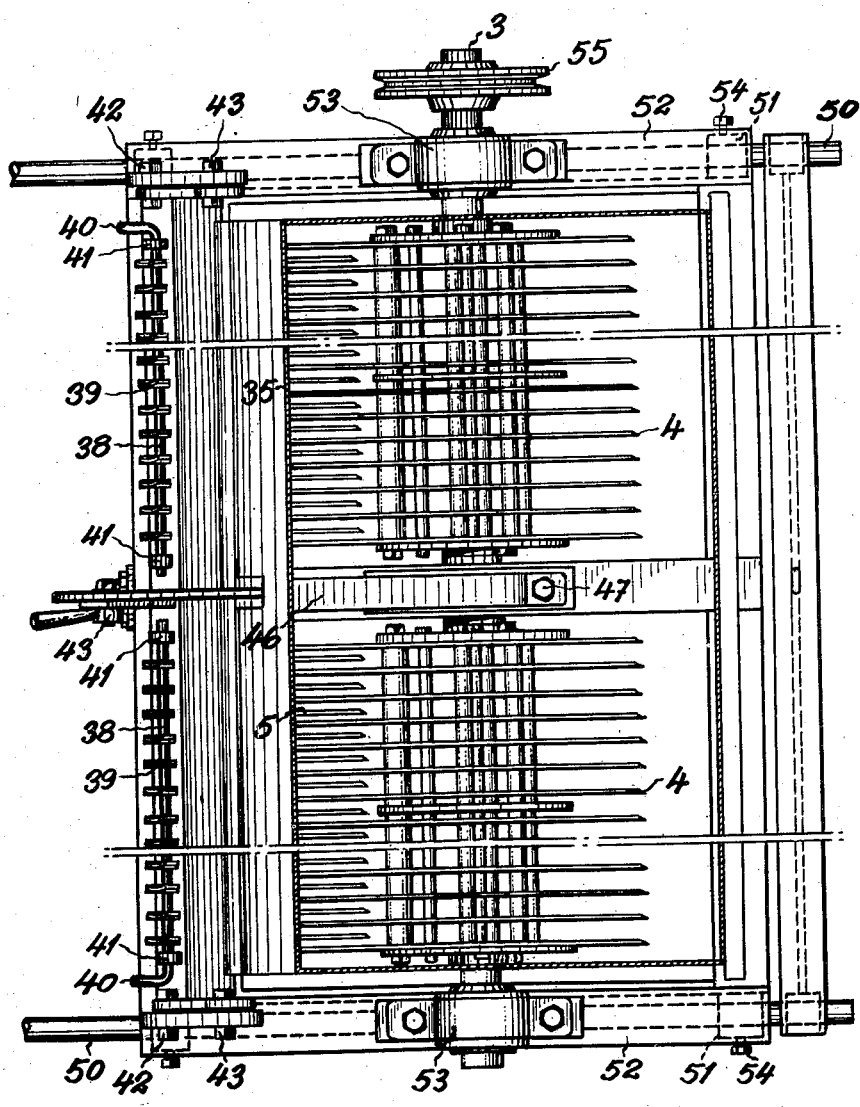

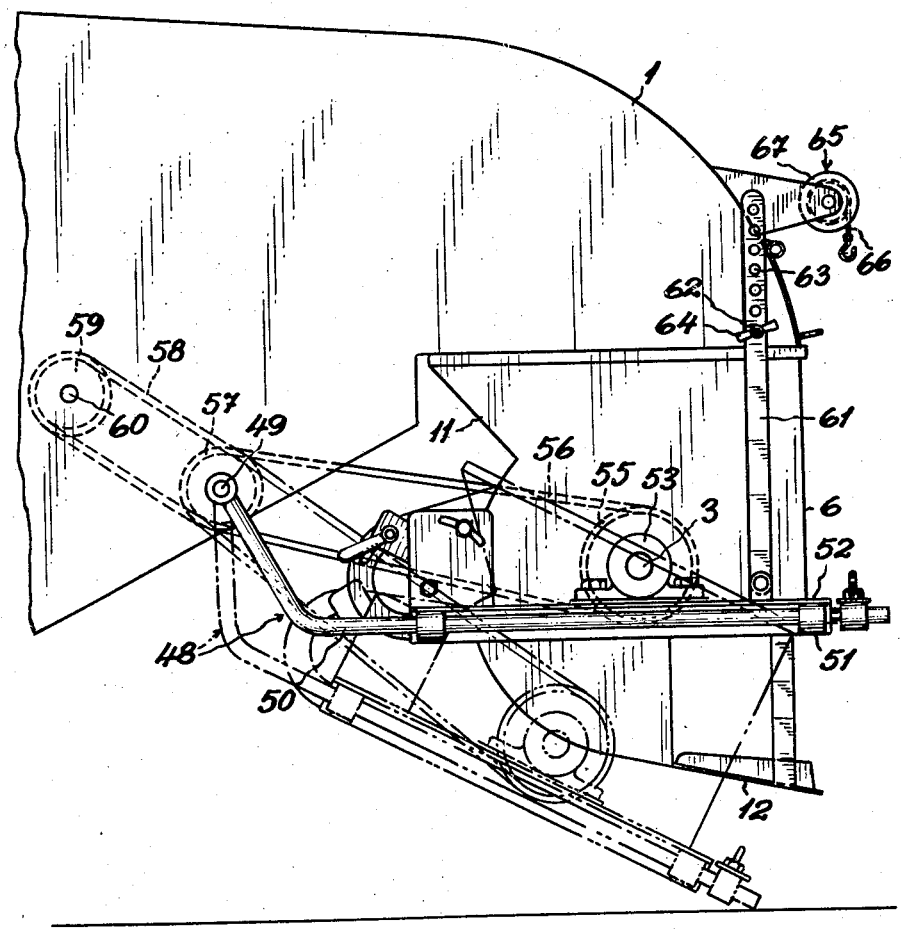

.
United States Patent Office 2,862,536
Patented Dec. 2, 1958

2,862,536

STRAW CUTTER FOR COMBINES

Anton B. Grönberg, Ottum, Sweden

Application August 9, 1954, Serial No. 448,462

1 Claim. (Cl. 146—117)

The present invention concerns a device for the cutting to pieces of straw or similar objects and the invention is mainly characterized by the fact that the device consists of a rotor comprising arms or the like which protrude from a revolving shaft and which during the revolution of the shaft are intended to pass between arms or equivalent means which serve as a counter for the straw and which are arranged like a grating towards which the straw is transported, the rotor arms and/or the counter arms being knives, so that the straw placed against the grating, is cut to short pieces by the rotor arms revolving through the grating.

The invention is described further in what follows with reference to the accompanying drawings, which illustrate some ways of carrying out the invention. Fig. 1 is a side-view of the rear of a threshing machine, supporting a cutting device in accordance with the invention. Fig. 2 represents an end view in Fig. 1 and looking in the direction of the arrows. Fig 3 is a perspective view of the cutting device shown in Figs. 1 and 2. Figs. 4–10 represent different ways of constructing the rotor arms and the counter arms. Fig. 11 is a side view of a cutting device according to another way of carrying out the invention. Fig. 12 is a side view of the rear of a threshing machine, provided with a cutting device according to a third way of executing the invention. Fig. 13 is an end view of a threshing machine, provided with a cutting device in accordance with one more way of carrying out the invention. Fig. 14 shows the rear of a combine, provided with another cutting device shown partly in vertical section. Fig. 15 is a view seen from the line XV—XV in Fig. 14. Fig. 16 is a view seen from the line XVI—XVI in Fig. 14. Fig. 17 is a section along the line XVII—XVII in Fig. 14. Finally Fig. 18 shows in a smaller scale the rear of a combine provided with the same cutting device as in Fig. 14.

In the drawings of Figs. 1 and 2, 1 indicates the rear of a threshing machine, for instance the threshing machine of a combine. 2 indicates a cutting device in accordance with the invention, intended for the cutting to pieces of the straw coming from the straw outlet of the threshing machine 1, the straw being thus cut into comparatively short pieces. The cutting device 2 includes a housing 6 in which is positioned a rotor comprising a revolving shaft 3, on which arms 4 are fastened, and besides there are stationary arms or grate bars 5 which serve as a counter for the straw and between which the rotor arms 4 pass when revolving. The rotor shaft 3 is carried by bearings at the short ends of the box or housing 6 or the like which is opened at the top and at the bottom, and the revolution of the rotor shaft 3 is brought about by a drive shaft 7 in the threshing machine. On this drive shaft is placed a pulley 8, which through the medium of one or several driving belts 9 brings about the revolution of the rotor shaft 3, and on the rotor shaft 3 there is placed a pulley 10, over which the driving belt 9 passes. The top of the box 6 is provided with a funnel-shaped filler 11, the cross section of which increases from the top of the box 6 to the straw outlet of the threshing machine, the top of this funnel 11 being attached to the outlet. As will be seen from Fig. 1, the cutting device 2 is supported in its entirety by the threshing machine.

When the cutting device 2 is attached to the straw outlet of a combine, the bottom of the box or housing 6 should be provided with a spreading device for the cut straw, so that the latter is spread in a direction transverse to that of the combine. The spreading device is constructed so as to place the cut straw on the field in the shape of a string of mainly the same width as the length of the cutting device of the combine. It is hereby achieved that the field in question gets an equally spread layer of cut straw, which can later on be ploughed in at a subsequent ploughing, which of course is facilitated by the fact that the straw has been cut to short pieces. It is evident that in this way a quick mixing of the straw with the soil or ground is obtained, which insures the soil being improved in relatively short time and at a minimum of cost. In Figs. 1 and 2 is shown one way of executing such a spreading device, consisting in this case of a guiding plate 12, which slopes downwards and backwards, and which at its top is attached to the front side wall of the box 6, whereas the bottom of the guiding plate is carried by angle irons 13 or the like, which are fixed on to the top of the funnel 11. It will be seen from Fig. 2 that the width of the guiding plate 12 increases from the bottom edge, the length of which should be mainly that of the cutting device of the combine, whereas the top edge of the guiding plate has the same length as the front side wall of the box. It will further be seen from Fig. 2 that the length of the cutting device is considerably shorter than the width of the threshing machine, which is made possible by the abovementioned construction of the device. A suitable construction of the arms can if so wanted further diminish the dimension of the cutting device perpendicular to the longitudinal direction of the combine. However, it is evident that in this execution of the cutting device, it is necessary to apply guiding devices such as the funnel 11, in order to direct the straw coming from the threshing machine down into the cutting device.

It is an essential feature of this invention that the rotor shaft 3 is mainly perpendicular to the direction in which the straw is conveyed. In this connection it should be mentioned that trials have shown that the straws are cut not only perpendicular to the longitudinal direction of the fibres but also along it, which entails that the straw moulders very soon when it has been ploughed in. It does not matter if the straw is conveyed to the cutting device perpendicular to its longitudinal direction or parallel to the latter; the threshing machine thus need not be provided with guiding devices for the conveyance of the straw in a certain relation to its longitudinal direction.

The counter arms 5 should be arranged at intervals each considerably larger than the thickness of the rotor arms 4. The cutting device according to the invention has proved to work considerably more favourably when the counter arms are arranged in this way, owing to the fact that the arms, when the apparatus is going, can swing sidewards, thereby striking against each other if the interval between the non-revolving arms is not sufficiently large. Thanks to the fact that there is an interval between the neighboring sides of the arms 4 and 5, it is even made possible for small objects, such as stones, to pass between the arms without damaging the latter.

From Fig. 3 it will be clearly seen that each counter arm 5 is attached to the front side-wall of the box 6 only at one end, the arm or grate bar 5 being for the rest quite free. The rotor shaft 3 is placed parallel to the free ends of the counter arms 5, arranged in a line, and the rotor shaft 3 lies at such a distance from the free ends of the counter arms 5 that there is a certain interval between the shaft 3 and the abovementioned ends. According to the invention it is, however, possible to let each counter arm 5 be fixed on to the box 6 at both ends in such a way that one end is attached to the front sidewall, whereas the other end is attached to the back sidewall of the box 6. In this case the rotor shaft 3 is placed either above or under the grating, formed by the counter arms 5, the shaft being suitably placed at some distance from the grating.

In the way of carrying out the invention shown in Fig. 3, the arms 4 and 5—at the edges intended for co-operation with the straw—have been provided with cutting edges; but tests have shown that in certain cases it is sufficient to provide only the rotor arms 4 or the counter arms 5 with cutting edges. For special purposes, for instance when an essential crushing of the straw is wanted, it is also possible to leave out the cutting edges of the arms, the thickness of which may vary from very thin to comparatively thick material.

Figure 5:
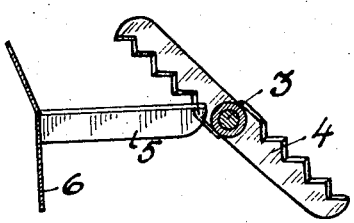
Figure 6:
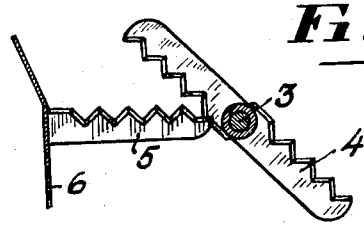
Figure 7:
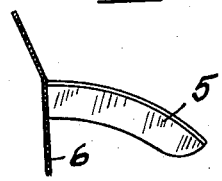
Figure 8:
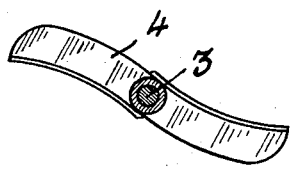
Figure 9:
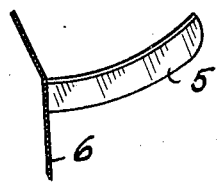
Figure 10:
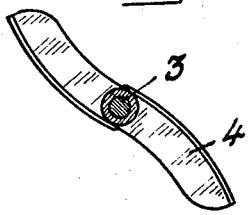

As will be seen from Figs. 4–6, the edges of the rotor arms and/or the counter arms, intended to co-operate with the straw, may be provided with teeth, which may be ground to edges. The purpose of this is to prevent effectively the straw from passing along the edges of the arms. In Fig. 4 is shown a combination where the counter arms are provided with teeth, whereas the rotor arms are provided with straight edges. In Fig. 5 it is just the contrary, the rotor arms being instead provided with teeth, whereas the counter arms have straight edges. In the way of carrying out the invention according to Fig. 6, both the counter arms and the rotor arms are provided with teeth.

In Figs. 7–10 are shown further ways of carrying out the reciprocally co-operating arms for the cutting to pieces of the straw. These figures show that the arms can be provided with edges, running along a curved line in a plane, perpendicular to the rotor shaft. The ways of carrying out the invention, shown in these figures, may be combined with each other in different ways in order to adapt the cutting device to the needs in each case.

When using straight edges or edges running along a curved line, it may be suitable to provide these edges with a shoulder in order to prevent the straw from passing along the edges. Such a shoulder may be found on each rotor or counter arm, at one end or at both ends, and may consist of a notch in the arm. When the cutting device is formed so that the straw may pass along the edges of the arms, such straw will press against the shoulders mentioned and be stopped there to be cut to pieces in this position by the continued moving of the rotor arms. The counter arms 5, as is shown in Fig. 3, may be placed on a common holding device, in this way of carrying out the invention a shaft 14, which is fixed on to the box 6. The counter arms 5 are arranged in this way in order to bring about a certain equalization of the load on both the rotor arms 4 and the counter arms 5, for instance when the feeding of the straw to the cutting device is irregular, or when stones or other firm objects are conveyed and placed against the grating formed by the counter arms 5. The arms 5 may be constructed in such a way, that stones or other firm objects, which are placed against the grating, may be directed along the arms 5 by the rotor arms 4, in order to be removed at their free ends, the counter arms 5 being fit to swing downwards such an angle that an essential interval arises between the underneath side of the rotor shaft 3 and the free ends of the counter arms 5.

The counter arms may be adjusted in different angular positions in a plane perpendicular to the rotor shaft. The object of this is to enable the grating, formed by the arms 5, to be adjusted in different positions with regard to the direction in which the straw that is transported towards the grating, is moving, so that the position of the grating is changeable and may be adapted to different needs, depending on for instance the quality of the straw. The arms 5 in addition to this may be adjusted in relation to each other in different angular positions.

It will be seen from Fig. 3 that the rotor arms 4 are attached to the rotor shaft 3 in different angular positions on a plane, perpendicular to the rotor shaft, the object of this being that only one arm or certain arms should be able to pass at the same time through the grating, formed by the counter arms 5. It is evident that this arrangement of the rotor arms 4 may be combined with the abovementioned way of carrying out the arms 5, which involves that the operation may be varied in several ways.

As is shown in Fig. 11, the rotor shaft may move in its transverse direction and be adjusted in different off-set positions in relation to the grating, formed by the arms 5. The rotor shaft 3 may thus be moved and adjusted in the horizontal direction in relation to the drive shaft 7, the tension of the driving belt 9 thereby becoming adjustable. In the way of carrying out the invention according to Fig. 11, the rotor shaft 3 can be moved against the action of springs 15, and this displacement may be brought about the torque operating on the shaft 3, this torque being the result of the co-operation of the rotor arms 4 with the straw that is to be cut. The rotor shaft 3 is placed in bearings 16 at the free ends of arms 17, which at 18 are placed on pivots at the two short ends of the box. The bearings 16 can be moved in slots 19 in the short ends of the box, and these slots may be applied for further guiding of the bearings 16. In this way of carrying out the invention, the arms 17—at a too great torque on the shaft 3—will be automatically turned upwards against the action of the springs 15, so that the shaft 3 is removed from the counter arms 5. Owing to this the tension of the driving belt 9 relaxes so that the belt can skid against the pulley 10, and it will be evident that in this way the arms 4 and 5 are prevented from being damaged on account of too heavy load.

In order to render possible the total removal of the rotor shaft 3 from the grating, formed by the counter arms 5, the slots 19 are open at the bottom, whereas the arms 17 at 20 rest on shoulders 21 that may be taken aside. The latter consist of arms, which are placed on pivots at the two short ends of the box and may be locked—by means of screws 22—in different turning positions.

In Fig. 1 a blowing fan 23 has been indicated by means of dot and dash lines; it may be connected to the outlet of the cutting device, so that the cut straw is transferred by the blowing fan either to a special spreading device— if the cutting device is placed in a combine—or for instance to a stock-room, if the cutting device is placed in a stationary threshing machine, in which case a conveyer may be connected to the outlet of the blowing fan.

In connection with the description of Figs. 1 and 2 it was suggested that a guide shield or something of the sort may be attached to the outlet of the cutting device. In order to obtain a suitable spreading of the cut straw, there may be placed guiding means 24 on the inside of the shield, and these guiding means extend upwardly from the shield and in the direction, in which the straw is conveyed, and being arranged side by side, as will be seen from Fig. 2.

The cutting device according to the invention can be disengageably attached to the threshing machine and be supported by the latter. This arrangement is particularly suitable when the cutting device is placed at a combine, and as is shown in Fig. 12, the cutting device may be moved in relation to the threshing machine in the directions towards and away from the drive shaft 7, so that the cutting device in its entirety may be taken away from the straw outlet of the threshing machine. At the edges of the top of the funnel 11, there are fastened beams 25 or the like which extend in the longitudinal direction of the threshing machine, and these beams co-operate telescopically with guiding means 26, arranged analogously, being fixed on to the threshing machine. It is evident that the driving belt 9 must be removed from the pulley 10, before the cutting device may be taken away from the threshing machine. At 27 there is indicated a device for the locking of the cutting device, and this locking device may be so constructed as to effect adjustment of the tension of the driving belt 9 at the same time.

In Fig. 13 is shown another device for the supporting of the cutting device, in which the box 2 at one corner edge is pivoted on the threshing machine by means of a shaft 28, so that the cutting device in its entirety can be moved away from the straw outlet of the threshing machine which is shown to the left in Fig. 13. In this case it may be suitable to provide one of the opposite corners of the box with a leg 29, which may be adjusted in vertical direction, so that the cutting device when moved out may be supported by the leg 29, too. 30 denotes a device for the adjustment of the length of the leg 29.

Experiments have proved the final shape of the box or housing 6 to be of essential importance and Figs. 14–17 illustrate a special execution of the box 6 which will considerably add to the effect of the cutting device. From the preceding will be gathered that the walls of the box form a guiding device for guiding the straw towards the rotor and the most important of these walls is the one indicated by 31, which is to be found close to the foremost part of the threshing machine and towards which the straw is conveyed by means of the rotor arms 4, which will rotate in a direction as indicated by arrow 32. The wall 31 is concentric with the rotor shaft 3 and it has its place at a short distance from the ends of the rotor arms 4, by which arrangement is achieved that these ends will treat the straw resting against the wall 31, whereby the straw will be partly cut to pieces and be crushed, whereupon the final dissection will take place through the rotor arms co-operating with the counter arms 5. As will be seen from Fig. 14, the counter arms 5 are positioned underneath the wall 31 and protrude into the box through an opening 33. In this form of execution the funnel-shaped part 11 has a somewhat deviating construction in as much as only one of the walls 34 of this part having a slanting position, while the remaining walls have a vertical position. Thus the wall 34 stretches aslant downwards backwards from the foremost edge of the straw outlet of the threshing machine, the wall 34 being at its lower edge firmly attached to or made in one piece with the upper edge of the wall 31. Together, these two edges are forming a ridge 35, which is of special importance as regards the device in its mode of operation in so far that the straw in flowing out along the wall 34 will be preparatorily operated upon by the rotor arms 4, the ridge 35 then serving as counter part for this work.

In the form of execution as per Figs. 14–17 all the counter arms 5 have a joint holder 36 with a rectangular cross section, where two opposite walls are provided with slits 37 for receiving the end parts of the counter arms 5, which are positioned furthermost from the rotor shaft 3. For a releasable hold fast of the counter arms 5 onto the holder, the device is equipped with one or several rods 38, which are parallel with the rotor shaft 3 and are conveyed through apertures in the ends parts of the counter arms. In order to make possible a lengthening or shortening of the active length of the counter arms 5, the end parts of the counter arms can be provided with a number of apertures for the rods, apertures distributed in the longitudinal direction of the arms. The flat and comparatively broad counter arms 5 can moreover, as will be seen from Fig. 15, be provided with pressing members 39, extending at right angles against the plane of the arms, and being intended to co-operate with the edges of the slits 37 for the purpose of preventing play between the opposite sides of the counter arms and the edges of the slits. As will also be seen from Fig. 15, the end parts 40 of the rods 38 are bent at angles to form a handle for shifting the rods into and out of the apertures in the end parts of the counter arms. Furthermore, the rods are conveyed through lugs 41 attached to the holder 36 and serving to fix the radial positions of the rods in their relation to the shaft of the holder, which is indicated as 42. The holder 36 is swingable around this shaft 42 and adjustable for different positions by means of screws 43 which are in co-operation with slits 44 in the stationary parts of the device. This adjustment of the holder 36, as will be easily understood, make it possible to have the counter arms 5 put into any suitable angular position in their relation to the rotor arms 4.

The comparatively long rotor shaft 3 is also carried right in the middle between its ends by means of a bearing 45 and in order to prevent the straw from accumulating on the bearing 45, the device is equipped with a guiding shield 46, stretching from the rear anchor bolt 47 of the bearing 45 over the bearing and up to the ridge 35, where the guiding shield is suitably fixed. As will be seen from Fig. 17 the guiding shield has no great width, but it is evident that the width of the guiding shield may be enlarged so that the edges of the guiding shield will get into the vicinity of the adjacent rotor arms 4. By arranging one or several guiding shields in this manner, the active axial length of the rotor may be reduced.

For the purpose of carrying the cutting device by the threshing machine it will be practicable, as more clearly shown by Fig. 18 but also to some extent will be gathered from Figs. 14–17, to employ a connecting assembly 48 which is combined with the threshing machine in such a way that, in its relation to the threshing machine, it will be swingable around a mainly horizontal shaft which is at right angles with the longitudinal direction of the threshing machine. Accordingly, this shaft will be parallel with the rotor shaft 3, belonging to the rotor of the cutting device. In attaching the assembly 48 to the threshing machine short axle journals 49, fixed to the side walls of the threshing machine, may be employed, or otherwise, instead of the axle journals 49, there may be one single shaft, stretching from one side of the threshing machine to the other.

As shown by the illustrated example, the assembly 48 includes two mutually parallel rods 50 or the like, each of which will be at one end swingably combined with an axle journal 49 and which may be quite independent of one another or otherwise may be jointly combined by means of some suitable stay means for the purpose of preventing the rods from swinging in their relation to one another. For its co-operation with the rods 50, in connection with the cutting device 2 being supported and pushed along the rods, the cutting device has been at its two opposite sides provided with means constituting rings 51, which are attached to the cutting device and serving for the rods to pass through shiftably. As will be seen from Fig. 17 each of the abovementioned opposite sides of the cutting device is equipped with two such rings 51, which are welded to the shanks of an angle iron 52, while in their turn the shanks are attached to the box 6 and will serve to strengthen it and to support the end bearing 53 for the rotor shaft 3. All the rings 51, or special ones of these have been provided with a transversal, threaded opening into which has been screwed a screw 54 (Figs. 15 and 16), which—by pressing against the rods 50 running through the rings 51—is purposed to fix the rings and thereby also the cutting device to the rods when shifted into different positions. The longitudinal direction of the rods 50 being in planes which are at right angles with the axle journals 49, it is evident that by pushing the cutting device along the rods 50 an advance of the shaft 3 towards the axle journals 49 or a removal of the shaft therefrom can be achieved. In Fig. 18 there is a belt pulley indicated as 55, which is fixed to one end of the rotor shaft 3 and over which runs a belt 56, which is likewise running over a belt pulley 57 on one of the axle journals 49. The belt pulley 57 has another groove for a further belt 58, running over a pulley 59, which is attached to a driving axle 60 belonging to the threshing machine. It is evident that the purpose of this arrangement is to force the rotor to rotate in the direction indicated by arrow 32 in Fig. 14. It need not be explained that this driving gear is such that the cutting device, while being fastened to the rods 50, can be swung along with these roundabout the shaft or the axle journals without changing the tension in any of the driving belts 56, 58.

The assembly 48 includes means for having it adjusted into different swinging positions, which means may consist of one or several rods, links or the like 61, jointly connecting the rear parts of the implement with those of the threshing machine. These are preferably two in number and made of flat bar iron whereby each rod 61 is at its lower end connected with one of the rods 50 and at its upper part connected with the threshing machine by the medium of a tap 62, which runs through one of several openings 63 arranged on top of one another in the upper end part of the rod 61. The tap bolt 62 is suitably fastened on the threshing machine and in order to prevent the rod 61 from getting unintentionally removed from the tap bolt, its outermost end part has been formed into a screw to which a nut 64 is applied, preferably a wing nut, for holding the rod fixed. The rods 61 can appropriately be releasably combined with the rods 50. In the drawing the tap bolt 62 is inserted into the bottom aperture 63 in each rod 61, but it is evident that instead of this the tap bolt 62 may be inserted into any of the upper apertures 63, whereby the active length of the rods can be altered and the assembly 48 can be adjusted for different swinging positions.

The swing of the assembly 48 from the position indicated by lines of dots and dashes—in which position the rear part of the assembly will rest on the ground—to the upper position shown by ordinary uninterrupted lines, or to some otherwise suitable medium position, can be achieved by means of a hoisting device 65 which is combined with the threshing machine and with the implement 48. This hoisting device 65 may include a line 66 at the rear end part of the implement, which line runs over a winding drum 67 lodged with the threshing machine with a crank arrangement 68, serving to make the drum turn round.

The implement 48 should be made for releasable support of the cutting device and the implement should also be releasably combined with the threshing machine.

Having now particularly described and ascertained my said invention and in what manner the same is to be performed, I declare that what I claim is:

In combination with a threshing machine having a straw outlet, a cutting device having a housing communicating with said outlet for receiving the straw, a transversely disposed shaft rotatably mounted in the housing and having longitudinally spaced cutting blades, spaced grate bars extending into said housing, said blades arranged to pass between said bars when the shaft is rotated, a pair of spaced parallel arms pivotally connected to the threshing machine and extending rearwardly therefrom, said housing being positioned between said arms, and means on said housing for receiving said arms, means for securing said housing in different positions of adjustment along said arms, means operatively connected between said arms and said threshing machine for moving and maintaining the cutter carried by said arms in vertical adjusted positions, said last-mentioned means being connected to said arms at a position spaced from the pivot point of the arms.

References Cited in the file of this patent
UNITED STATES PATENTS

| | | |
|---|---|---|
| 1,844,344 | Breeden | Feb. 9, 1932 |
| 2,281,846 | Klein | May 5, 1942 |
| 2,554,669 | Elofson | May 29, 1951 |
| 2,708,582 | Adams | May 17, 1955 |

FOREIGN PATENTS

| | | |
|---|---|---|
| 862,383 | Germany | Jan. 12, 1953 |
| 179,126 | Austria | July 26, 1954 |